(12) United States Patent
Kelly, Jr. et al.

(10) Patent No.: US 7,403,153 B2
(45) Date of Patent: Jul. 22, 2008

(54) SYSTEM AND METHOD FOR REDUCING A RADAR INTERFERENCE SIGNAL

(75) Inventors: Thomas M. Kelly, Jr., Dedham, MA (US); R. Gregory Aeder, Westford, MA (US); Walter Gordon Woodington, Lincoln, MA (US)

(73) Assignee: Valeo Raytheon Systems, Inc., Hudson, NH (US)

( * ) Notice: Subject to any disclaimer, the term of this patent is extended or adjusted under 35 U.S.C. 154(b) by 243 days.

(21) Appl. No.: 11/012,679

(22) Filed: Dec. 15, 2004

(65) Prior Publication Data

US 2006/0125682 A1    Jun. 15, 2006

(51) Int. Cl.
*G01S 13/34* (2006.01)
*G01S 7/36* (2006.01)
(52) U.S. Cl. .................... 342/159; 342/132; 342/16
(58) Field of Classification Search ............... 342/159, 342/128–132; 375/346, 349–350
See application file for complete search history.

(56) References Cited

U.S. PATENT DOCUMENTS

| | | | |
|---|---|---|---|
| 2,540,839 A | | 2/1951 | Southworth |
| 2,676,214 A | * | 4/1954 | Van Weel .................... 327/179 |
| 4,176,337 A | * | 11/1979 | Aechter et al. ............... 367/138 |
| 4,286,236 A | | 8/1981 | Fischer |
| 4,669,301 A | * | 6/1987 | Kratt et al. .................. 73/118.2 |
| 4,733,237 A | | 3/1988 | Apostolos et al. |
| 4,939,378 A | * | 7/1990 | Joannes et al. ......... 250/559.08 |
| 5,194,823 A | | 3/1993 | Wendt et al. |
| 5,271,038 A | * | 12/1993 | Cai ............................ 375/317 |
| 5,280,288 A | | 1/1994 | Sherry et al. |
| 5,303,414 A | * | 4/1994 | Brinkhaus ................... 455/296 |
| 5,343,499 A | * | 8/1994 | Jasper et al. ................ 375/261 |
| 5,365,328 A | * | 11/1994 | Anderson ................... 356/73.1 |
| 5,563,604 A | * | 10/1996 | Brandao et al. ............. 342/159 |
| 5,592,178 A | | 1/1997 | Chang et al. |
| 5,708,433 A | | 1/1998 | Craven |

(Continued)

FOREIGN PATENT DOCUMENTS

JP    11352215 A  *  12/1999

(Continued)

OTHER PUBLICATIONS

Cheng; "A Fast Hybrid MoM/FEM Technique for Microstripline Vertical Couplers With Multiple Identical Cavaties;" IEEE Jun. 2003; 0-7803-7846; pp. 1076-1079.

(Continued)

*Primary Examiner*—Thomas G. Black
*Assistant Examiner*—Shelley Chen
(74) *Attorney, Agent, or Firm*—Daly, Crowlet, Mofford & Durkee, LLP

(57) ABSTRACT

A system and method are provided to reduce an interfering signal in a radar return signal for a frequency modulated continuous wave (FMCW) radar. Once the interfering signal is detected, an extent of the interfering signal is determined and the interfering signal is removed from the radar return signal. This allows the radar to detect a target in the presence of the interfering signal. The system and method can benefit any FMCW radar that is within the range of an interfering radar source (e.g. another FMCW radar, a police radar gun, a pulse radar, etc.) operating in the same frequency band as the FMCW radar.

26 Claims, 11 Drawing Sheets

U.S. PATENT DOCUMENTS

| | | | |
|---|---|---|---|
| 5,727,023 A | 3/1998 | Dent | |
| 5,870,022 A * | 2/1999 | Kuhnly et al. | 340/567 |
| 5,872,540 A * | 2/1999 | Casabona et al. | 342/362 |
| 6,028,549 A * | 2/2000 | Buckreuss et al. | 342/159 |
| 6,039,580 A | 3/2000 | Sciarretta et al. | |
| 6,164,540 A * | 12/2000 | Bridgelall et al. | 235/462.01 |
| 6,167,286 A | 12/2000 | Ward et al. | |
| 6,198,449 B1 | 3/2001 | Muhlhauser et al. | |
| 6,218,987 B1 | 4/2001 | Derneryd et al. | |
| 6,219,376 B1 * | 4/2001 | Zhodzishsky et al. | 375/148 |
| 6,239,586 B1 * | 5/2001 | Fawcett et al. | 324/76.65 |
| 6,242,900 B1 * | 6/2001 | Fawcett et al. | 324/76.65 |
| 6,243,652 B1 * | 6/2001 | Fawcett et al. | 702/65 |
| 6,288,395 B1 * | 9/2001 | Kuhnly et al. | 250/339.04 |
| 6,314,055 B1 * | 11/2001 | Foxlin et al. | 367/127 |
| 6,324,755 B1 | 12/2001 | Borkowski et al. | |
| 6,335,905 B1 * | 1/2002 | Kabel | 367/98 |
| 6,463,303 B1 | 10/2002 | Zaho | |
| 6,489,927 B2 | 12/2002 | LeBlanc et al. | |
| 6,492,949 B1 | 12/2002 | Breglia et al. | |
| 6,501,415 B1 | 12/2002 | Viana et al. | |
| 6,559,657 B1 * | 5/2003 | McCarthy et al. | 324/642 |
| 6,567,200 B1 * | 5/2003 | Pammer et al. | 398/202 |
| 6,577,265 B2 * | 6/2003 | Dalton et al. | 342/26 R |
| 6,577,269 B2 | 6/2003 | Woodington et al. | |
| 6,577,879 B1 | 6/2003 | Hagerman et al. | |
| 6,642,908 B2 | 11/2003 | Pleva et al. | |
| 6,683,557 B2 | 1/2004 | Pleva et al. | |
| 6,704,378 B2 * | 3/2004 | Jagger et al. | 375/346 |
| 6,738,017 B2 | 5/2004 | Jacomb-Hood | |
| 6,784,838 B2 | 8/2004 | Howell | |
| 6,864,699 B2 | 3/2005 | Sakayori et al. | |
| 6,868,114 B2 * | 3/2005 | Bially et al. | 375/148 |
| 6,933,900 B2 | 8/2005 | Kitamori et al. | |
| 6,937,676 B2 * | 8/2005 | Takada et al. | 375/346 |
| 6,995,730 B2 | 2/2006 | Pleva et al. | |
| 7,031,402 B2 * | 4/2006 | Takada | 375/296 |
| 7,038,608 B1 | 5/2006 | Gilbert | |
| 2002/0109192 A1 * | 8/2002 | Hogyoku | 257/365 |
| 2002/0155812 A1 * | 10/2002 | Takada | 455/63 |
| 2003/0210175 A1 * | 11/2003 | Bickert et al. | 342/93 |
| 2003/0210179 A1 * | 11/2003 | Dizaji et al. | 342/159 |
| 2004/0027305 A1 | 2/2004 | Pleva et al. | |
| 2004/0130482 A1 | 7/2004 | Lin et al. | |
| 2004/0164892 A1 | 8/2004 | Shinoda et al. | |
| 2004/0208249 A1 | 10/2004 | Risbo et al. | |
| 2005/0079834 A1 * | 4/2005 | Maniwa et al. | 455/114.3 |
| 2006/0009916 A1 * | 1/2006 | Li et al. | 702/20 |
| 2006/0049978 A1 * | 3/2006 | Siegel | 342/159 |
| 2006/0125682 A1 * | 6/2006 | Kelly et al. | 342/159 |
| 2006/0181448 A1 | 8/2006 | Natsume et al. | |

FOREIGN PATENT DOCUMENTS

| | | | |
|---|---|---|---|
| WO | WO 02/086536 A2 | 10/2002 | |
| WO | WO 2004/044610 A1 | 5/2004 | |

OTHER PUBLICATIONS

Gao et al.: "Adaptive Linearization Schemes for Weakly Nonlinear Systems Using Adaptive Linear and Nonlinear FIR Filters;" Dept. of Electrical Engineering, University of Toronto; IEEE; Jan. 1991; CH2819-1/90/0000-0009; pp. 9-12.

Lin et al.; "A High Speed Low-Noise Equalization Technique with Improved Bit Error Rate;" EEE; Jul. 2002; 0-7803-7448; pp. 564-567.

Lohinetong et al.; "Microstrip To Surface Mounted Foam-Based Waveguide Transition For Ka-Band Filter Integration;" IEEE Jun. 2004; 0-7803-8401; pp. 899-902.

Mueller; "SMD-Type 42 GHz Waveguide Filter;" IEEE Jan. 2003; 0-7803-7695; pp. 1089-1092.

Nordsjo; "An Algorithm for Adaptive Predisortion of Certain Time-Varying Nonlinear High-Power Amplifiers;" 2002 The Institution of Electrical Engineers; XP-002364938; pp. 469-473.

EP Search Report and Written Opinion of the European Patent Office for EP 05 11 1991.5; dated Mar. 2, 2006.

EP Search Report and Written Opinion of the European Patent Office for EP 05 11 1994.9 dated Mar. 31, 2006.

EP Report and Written Opinion of the European Patent Office for EP 05 111 983.2 dated Apr. 7, 2006.

Pleva, et al.; "Beam Architecture For Improving Angular Resolution"; U.S. Appl. No. 11/026,506, filed on Dec. 30, 2004.

Leblanc et al.; "Vehicle Radar Sensor Assembly"; U.S. Appl. No. 11/323,816, filed on Dec. 30, 2005.

Pleva, et al.; "Waveguide—Printed Wiring Board (PWB) Interconnection"; U.S. Appl. No. 11/027,523, filed on Dec. 30, 2004.

Kelly, Jr. et al.; "Method and System for Radar Processing;" U.S. Appl. No. 11/458,126, filed on Jul. 18, 2006.

Lohmeier et al.; "System And Method For Generating A Radar Detection Threshold;" U.S. Appl. No. 11/322,684, filed on Dec. 30, 2005.

Lohmeier et al.; "System And Method For Verifying A Radar Detection;" U.S. Appl. No. 11/324,073, filed on Dec. 30, 2005.

Lohmeier et al.; "Method And System For Generating A Target Alert;" U.S. Appl. No. 11/322,869, filed on Dec. 30, 2005.

Woodington, et al.; "Detecting Signal Interference In A Vehicle System"; U.S. Appl. No. 11/427,829, filed on Jun. 30, 2006.

Hunt; "Generating Event Signals In A Radar System;" U.S. Appl. No. 11/323,960, filed on Dec. 30, 2005.

Gilbert; "Multi-Stage Finite Impulse Response Filter Processing"; U.S. Appl. No. 11/323,459, filed on Dec. 30, 2005.

Woodington, et al.; "Multichannel Processing Of Signals In A Radar System"; U.S. Appl. No. 11/323,458, filed on Dec. 30, 2005.

Woodington, et al.; "Vehicle Radar Systems Having Multiple Operating Modes"; U.S. Appl. No. 11/324,035, filed on Dec. 30, 2005.

Woodington; "Reducing Undesirable Coupling Of Signal(s) Between Two Or More Signal Paths In A Radar System"; U.S. Appl. No. 11/323,982, filed on Dec. 30, 2005.

PCT Search Report and Written Opinion of the ISA for PCT/US2007/088063 filed on Dec. 19, 2007, dated Apr. 28, 2008.

* cited by examiner

SYSTEM AND METHOD FOR REDUCING A RADAR INTERFERENCE SIGNAL

CROSS-REFERENCE TO RELATED APPLICATIONS

Not applicable.

STATEMENTS REGARDING FEDERALLY SPONSORED RESEARCH

Not applicable.

FIELD OF THE INVENTION

This invention relates generally to radar systems and methods and, more particularly, to a radar system and method that can reduce or eliminate an interfering signal that may be present in a radar return signal.

BACKGROUND OF THE INVENTION

As is known in the art, a frequency modulated continuous wave (FMCW) radar transmits a radar signal at a transmitted frequency that is continuously changing. In order to identify a range to a target, the FMCW radar measures a difference in frequency between a received radar signal, which is returned as an echo from the target, and the transmitted frequency. The difference in frequency is associated with a time delay between the transmitted signal and the received signal, i.e., a time that it takes the transmitted signal to reach the target and to return back to the radar.

In typical FMCW radar, for example, the frequency of the transmitted FMCW signal linearly increases from a first predetermined frequency to a second predetermined frequency in a so-called "chirp" signal. The chirp signal is often repeated at a repetition rate. FMCW radar has the advantages of high sensitivity, relatively low transmitter power, and good range resolution. In one conventional FMCW radar, the chirp signal varies substantially linearly from approximately 24.05 GHz to approximately 24.25 GHz.

A conventional FMCW radar uses a mixer, which mixes (i.e., multiplies) the transmitted and received signals. One of the outputs of the mixer is the above-described difference in frequency between the transmitted and received signals, which is also referred to herein as a "downconverted signal" or a "video signal", which can have a "beat frequency." The downconverted signal occurs at a frequency substantially lower than the frequency of the transmitted or received signals. The downconverted signal can be time sampled, for example, with an analog-to-digital (A/D) converter, and the time samples can be converted to the frequency domain, for example, with a fast Fourier transform (FFT) to provide a frequency spectrum. From the frequency spectrum, a variety of techniques can be used to identify the downconverted signal associated with range to the target. Some such techniques are described in U.S. Pat. No. 6,577,269, issued Jun. 10, 2003.

It will be appreciated that the frequency spectrum contains not only the downconverted signal corresponding to range to the target, but also contains noise. The noise is associated with a variety of noise sources including, but not limited to, electrical (i.e., thermal) noise sources and radar signal noise sources that may be present in the environment in which the FMCW radar is used. It will also be appreciated that there can be more than one target in a field of view of the radar system. Therefore, the time samples of the downconverted signal can include more than one beat frequency.

In order to locate a range to the target from the frequency spectrum, a frequency signal within the frequency spectrum is identified, the frequency of which is indicative of a range to the target. However, some types of interfering radar signals can greatly degrade the ability to find the frequency signal associated with the target within the frequency spectrum. For example, an interfering radar signal at sufficiently high power level and within the swept band (i.e., within the chirp frequency limits) of the FMCW radar can corrupt the time samples of the downconverted signal to such an extent that the resulting frequency spectrum is overwhelmed by the interfering signal and so the frequency signal associated with the target cannot be found in the frequency spectrum.

Referring now to FIG. 1, a graph 10 has a horizontal axis in units of frequency provided as FFT frequency bins and a vertical axis in units of dB in FFT counts (provided by FFT processing of time samples of the downconverted signal). A curve 12 has a peak 14 indicative of a beat frequency, f1, and a corresponding range to a target. The curve 12 also has a noise background 16. A curve 18 has no distinct peak that is clearly characteristic of a target. The curve 18 is indicative of the output of the FFT frequency domain processing when a received signal represented by the curve 12 also includes an interfering signal.

It will be appreciated that, even where the interfering signal is at a single frequency, the resulting processing of the FMCW radar system, including the above-described mixing, and the above-described FFT processing, results in a smearing of the single interfering signal frequency throughout the frequency spectrum. This is due to the fact that the mixing process provides a mixing output signal corresponding to the interfering signal for only a brief time. An apparent increase in the noise level across some or all of the frequency spectrum reduces the signal to noise ratio (SNR) of the peak 14 (i.e., of the target) and greatly reduces the probability of detection of the FMCW radar. In the curve 18, either the peak 14 cannot be found, or the peak 14 cannot be accurately found.

One particular application of the FMCW radar is in an automobile radar system, for example, used to detect an object in a blind spot next to a vehicle. Automobile radars often use the above-described frequency chirp extending, for example, from approximately 24.05 GHz to approximately 24.25 GHz. Conventional police radars used, for example, to detect speed of vehicles, operates within this band, for example, at approximately 24.197 GHz. In automobile applications, it is necessary to provide a radar system capable of accurately and reliably detecting objects, e.g., other vehicles, with minimal influence from interfering signals.

Accuracy and reliability of the radar system are very important. Characteristics of the vehicle radar system that contribute to accuracy and reliability include susceptibility of the sensor to noise, including interfering signals, and the overall precision with which received radio frequency (RF) signals are processed in the presence of the noise and interfering signals to detect objects. Susceptibility to noise, including interfering signals, can cause a vehicle radar system to falsely detect an object (i.e., to raise a false alarm rate), and/or, can cause the vehicle radar system to miss a detection of an object (i.e., to have a reduced probability of detection).

SUMMARY OF THE INVENTION

In accordance with the present invention, a method for processing radar signals includes generating time samples associated with the radar return signal and processing the time samples to detect an interfering signal in the time samples. In some embodiments, the method further includes determining an extent of the interfering signal, and removing the interfering signal from the time samples.

In accordance with another aspect of the present invention, a method of detecting an interfering signal in a radar return signal includes generating time samples associated with the radar return signal, generating an array having array values associated with the time samples, generating at least one threshold associated with the array values, comparing the array values with the at least one threshold, and detecting that the interfering signal exists if at least a selected number of array values exceed the at least one threshold. In some embodiments, the array values are a selected one of slope (first order derivative) values, higher order derivative values, time sample absolute values, and power values associated with the time samples.

In accordance with yet another aspect of the present invention, a method of determining an extent of an interfering signal associated with a radar return signal includes generating time samples associated with the radar return signal, identifying a lower array sample limit and an upper array sample limit associated with the time samples and with the interfering signal. The method further includes selecting a first sample guard band value and selecting a second sample guard band value. The method also includes subtracting the first sample guard band value from the lower array sample limit to provide an interfering signal lower array sample extent and adding the second sample guard band value to the upper array sample limit to provide an interfering signal upper array sample extent. Still further, the method includes identifying at least one of an interfering signal lower time sample extent and an interfering signal upper time sample extent in accordance with the interfering signal lower array sample extent and the interfering signal upper array sample extent, respectively.

In accordance with yet another aspect of the present invention, a method of removing an interfering signal from a radar return signal includes generating time samples associated with the radar return signal, identifying a lower array sample limit and an upper array sample limit associated with the time samples and with the interfering signal, selecting a first sample guard band value, selecting a second sample guard band value, subtracting the first sample guard band value from the lower array sample limit to provide an interfering signal lower array sample extent, and adding the second sample guard band value to the upper array sample limit to provide an interfering signal upper array sample extent. The method further includes identifying at least one of an interfering signal lower time sample extent and an interfering signal upper time sample extent in accordance with the interfering signal lower array sample extent and the interfering signal upper array sample extent, respectively. The method also includes a selected one of: (a) selecting a group of contiguous time samples excluding time samples between the interfering signal lower time sample extent and the interfering signal upper time sample extent, and padding the group of contiguous time samples; and (b) generating a weighting function in accordance with the interfering signal lower time sample extent and the interfering signal upper time sample extent and applying the weighting function to the time samples.

In accordance with yet another aspect of the present invention, a system to process a radar return signal includes a radar receiving module to provide a downconverted signal, a radar signal sampling module coupled to the radar receiving module to provide time samples associated with the downconverted signal, and an interference detector coupled to receive the time samples and to detect an interfering signal in the time samples. In some embodiments, the system also includes an interference extent processor coupled to the interference detector to determine an extent of the interfering signal and an interference removal processor coupled to the interference extent processor to remove the interfering signal from the time samples.

With these arrangements, a system and technique for detecting an interfering radar signal incident on an FMCW radar is provided. Once the interfering signal is detected, the extent of the interfering signal can be determined and corrupted time samples associated with the interfering signal can be removed from the downconverted signal. This allows the FMCW radar to detect, track, and/or classify a target in the presence of the interfering signal. The system and technique can benefit any FMCW radar that is used in the presence of another system that generates an interfering signal (e.g. another FMCW radar, a police radar gun, a pulse radar, etc.) operating in the same frequency band as the FMCW radar.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before describing the radar system and method of the present invention, some introductory terms and concepts are discussed. As used herein, the term "frequency modulated continuous wave (FMCW) radar system" is used to describe a particular type of radar system that transmits an FMCW signal, also referred to herein as a "chirp" signal, that changes with time from an intial frequency to a final frequency. The FMCW radar system receives and processes a return signal from a target, which also has the chirp characteristics. As used herein, the terms "downconverted signal" and "video signal" are used to describe an output of a mixer circuit used in a receive portion of the FMCW radar system. The downconverted signal is representative of a frequency difference between the transmitted radar signal and the return signal from the target. Where a return signal substantially from but one target is received, the downconverted signal can have a "beat frequency" indicative of a largest amplitude frequency generated in the mixing process.

Embodiments described below process time samples of a downconverted radar return signal to generate a slope (first derivative) array having slope values, which is used to detect and to determine an extent of an interfering signal. The embodiments described below show slope values to be absolute values. However, as used herein, the term "slope values" refers either to values associated with absolute value of slope or associated with non-absolute value of slope. As described below, some particular slope values are associated with an upper and a lower slope sample limit, and an upper and a lower slope sample extent (e.g., in FIG. 4). While slope is used in the illustrative embodiments below, it should be appreciated that other array types could be used to detect and to determine the extent of the the interfering signal. For example, in other embodiment, the time samples can be processed to generate a power array having power values, resulting intead in an upper and a lower power sample limit, and an upper and a lower power sample extent. Other alternate array types are further described below.

Figure 2:
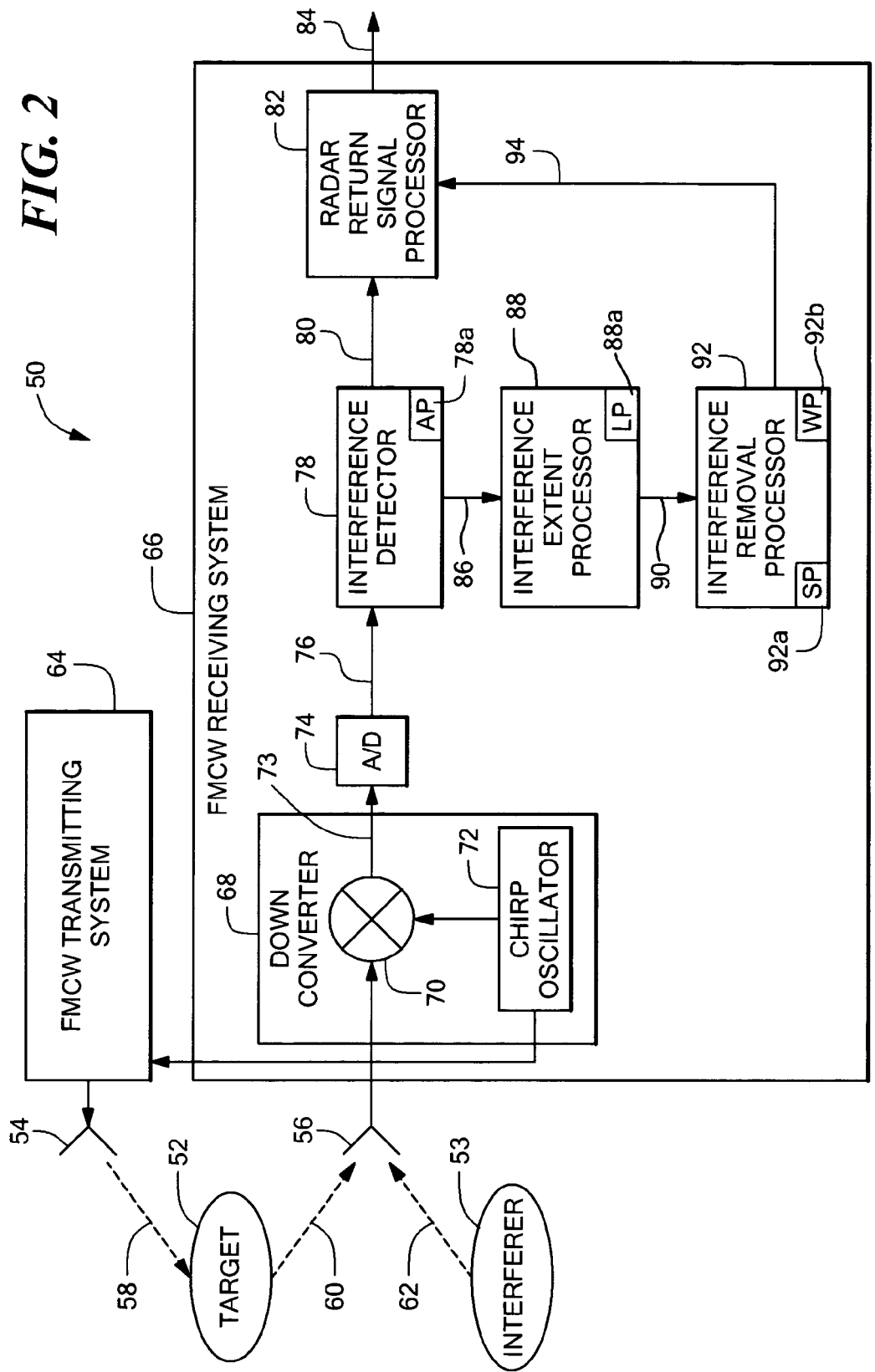
FIG. 2 is a block diagram of an FMCW radar system adapted to reduce an interfering signal in accordance with the present invention.

Referring now to FIG. 2, an FMCW radar system 50 includes an FMCW transmitting system 64 coupled to a transmitting antenna 54. The FMCW radar system 50 also includes an FMCW receiving system 66 coupled to a receiving antenna 56. The FMCW receiving system 66 includes a radar receiving module 68 to provide a downconverted signal 73 and a radar signal sampling module 74 (analog-to-digital (A/D) converter) to provide time samples 76 associated with the downconverted signal 73. The radar system 50 also includes an interference detector 78 (having an array processor 78a) coupled to receive the time samples 76 and to process the time samples 76 to identify an interfering signal. The radar system 50 also includes an interference extent processor 88 (having a limit processor 88a) to determine an extent of the interfering signal and an interference removal processor 92 (having one or both of a selection processor 92a and a weighting processor 92b) to remove the interfering signal from the time samples associated with the radar return signal, providing a processed signal 94.

In operation, the FMCW radar system 50 generates a radar chirp 58 via a tranmitting antenna 54, which echoes from a target 52, returning a target echo 60, which is received by a receiving antenna 56. The receiving antenna 56 can be the same antenna or a different antenna from the transmitting antenna 54. An interferer 53 can be present, which generates an interfering radar signal 62 also received by the receiving antenna.

Both the radar echo 60 and the interfering radar signal 62 are downconverted by a mixer 70, providing the downconverted signal 73. The downconverted signal is sampled by the A/D converter 74, providing the time samples 76 to the interference detector 78. The time samples 76 can include an interfering signal associated with the interfering radar signal 62.

Figures 4, 4A:
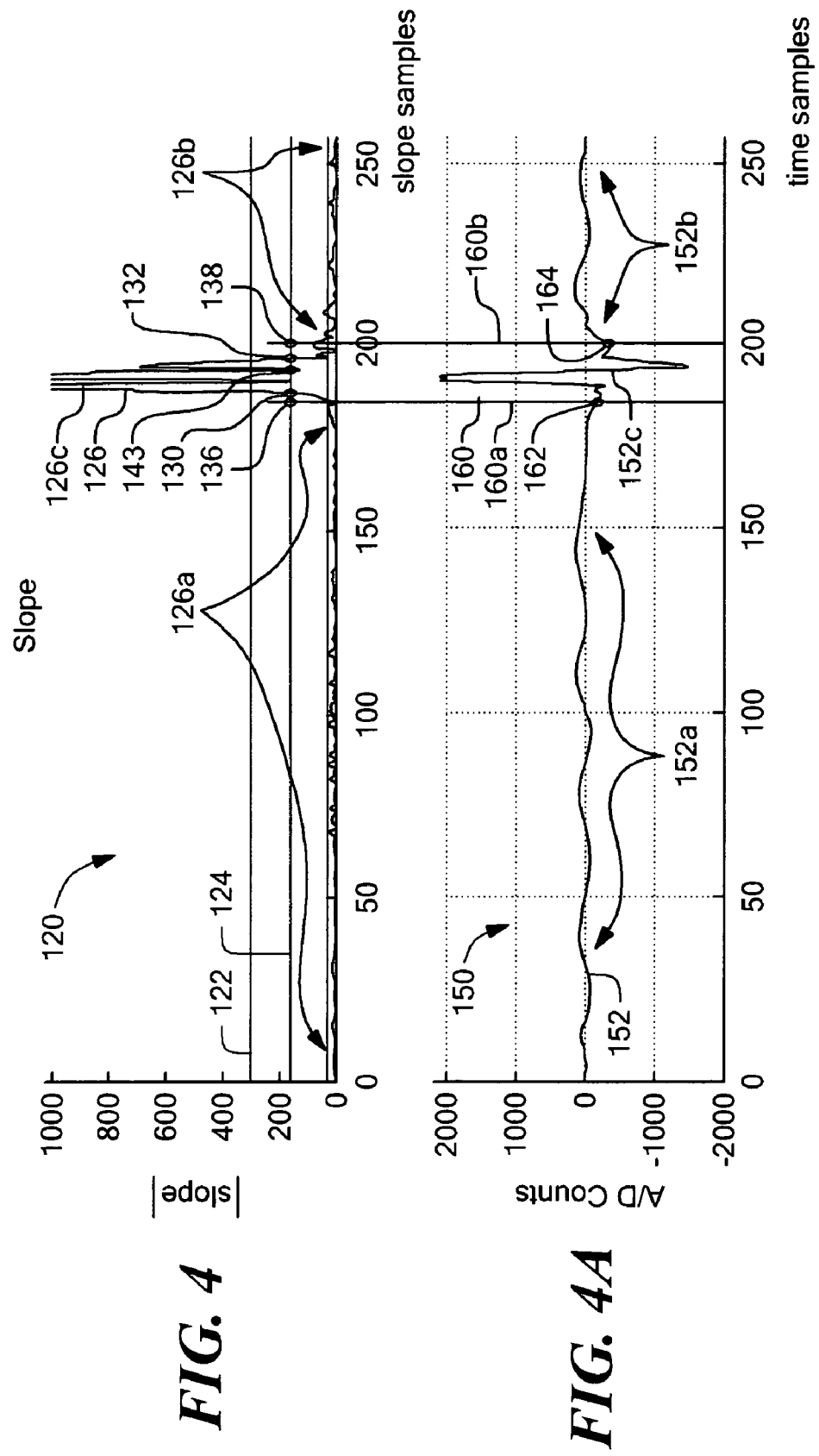
FIG. 4 is a graph showing the absolute value of the slope associated with time samples of a downconverted signal provided by the FMCW radar system of FIG. 2 in the presence of an interfering signal.
FIG. 4A is a graph showing time samples of a downconverted signal provided by the FMCW radar system of FIG. 2 in the presence of an interfering signal.
Figure 8:
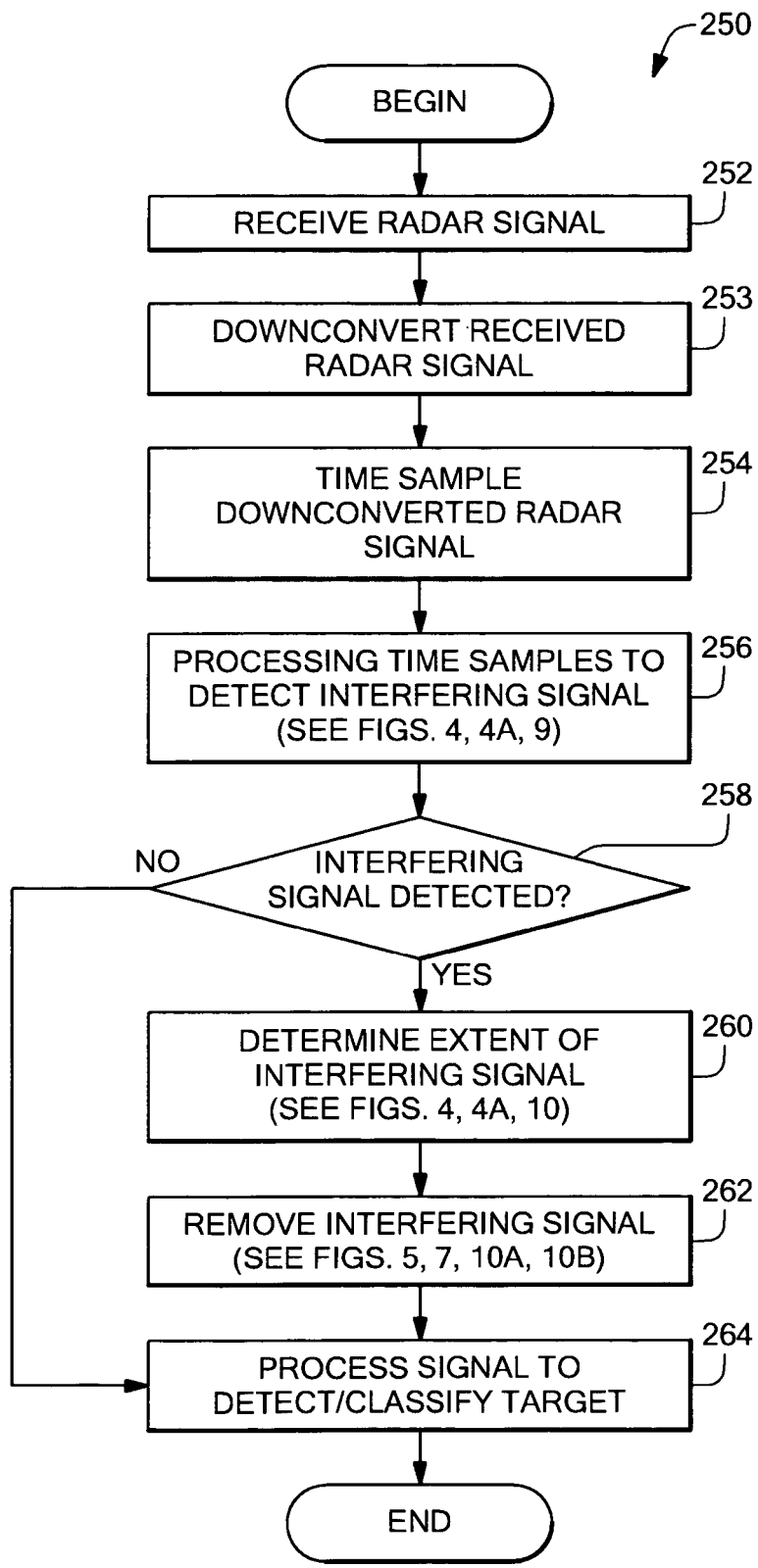
FIG. 8 is a flow chart showing a process for removing an interfering signal.
Figure 9:
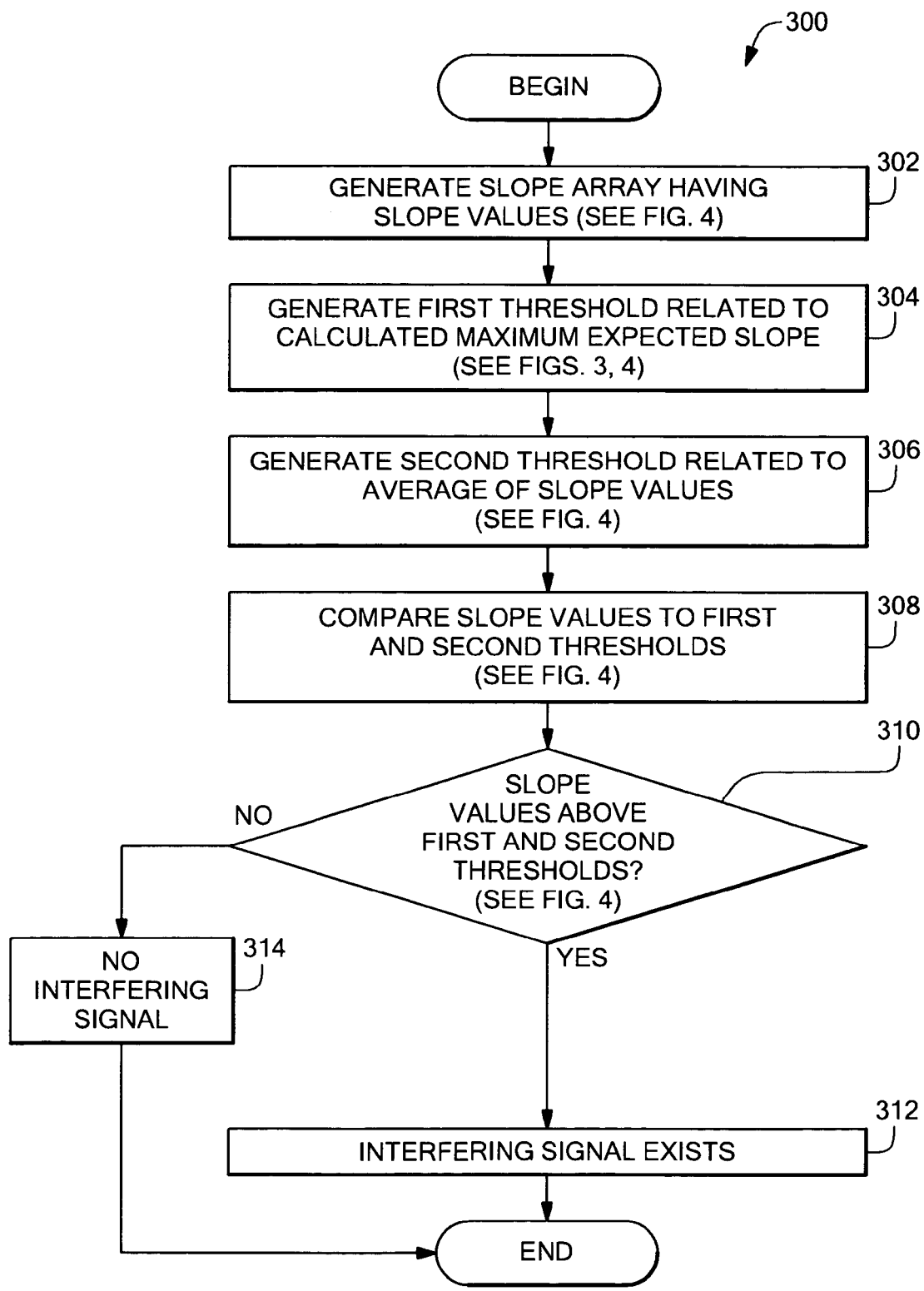
FIG. 9 is a flow chart showing further details of the process of FIG. 8.

Operation of the interference detector 78 is described in greater detail in conjunction with FIGS. 4, 8 and 9. However, in operation, in one particular embodiment, the interference detector 78 processes the time samples 76 to detect an interfering signal within the time samples 76 by generating a slope array having slope array values associated with the time samples and by comparing the slope array values with at least one threshold.

Figure 10:
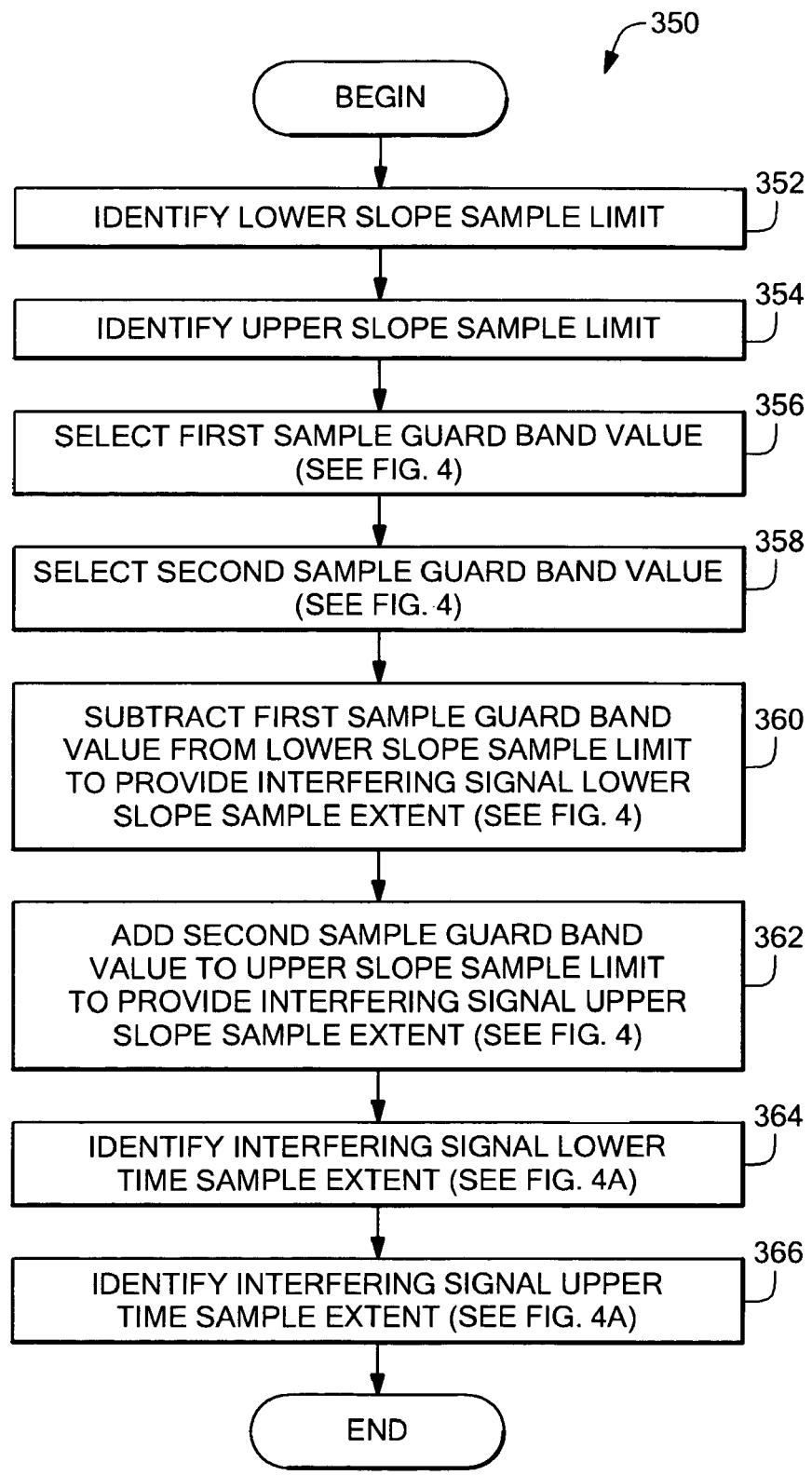
FIG. 10 is a flow chart showing yet further details of the process of FIG. 8.

Operation of the interference extent processor 88 is described in greater detail in conjunction with FIGS. 4A, 8, and 10. However, in operation, in one particular embodiment, the interference extent processor 88 idenifies a lower slope sample limit and an upper slope sample limit associated with slope array values that exceed the at least one threshold. The interference extent processor 88 expands these limits by using sample guard band values to provide the interfering signal extent (e.g., time extent).

Operation of the interference removal processor 92 is described in greater detail in conjunction with FIGS. 5, 8, 10, and 10A. However, the interference removal processor can select a contiguous group of time samples within the time samples 76, not including time samples within the interfering signal extent identified by the interference extent processor 88. In one particular embodiment, the interference removal processor 92 can pad the selected time samples, for example, zero pad the selected time samples. Essentially, the contiguous group of time samples are the time samples that will not be removed.

Where the interference detector does detect an interfering signal, the radar return signal processor operates on a signal 94. However, where the interference detector 78 does not detect an interfering signal, the radar return signal processor 82 operates on a signal 80, which can be the same as the times samples 76.

Figure 3:
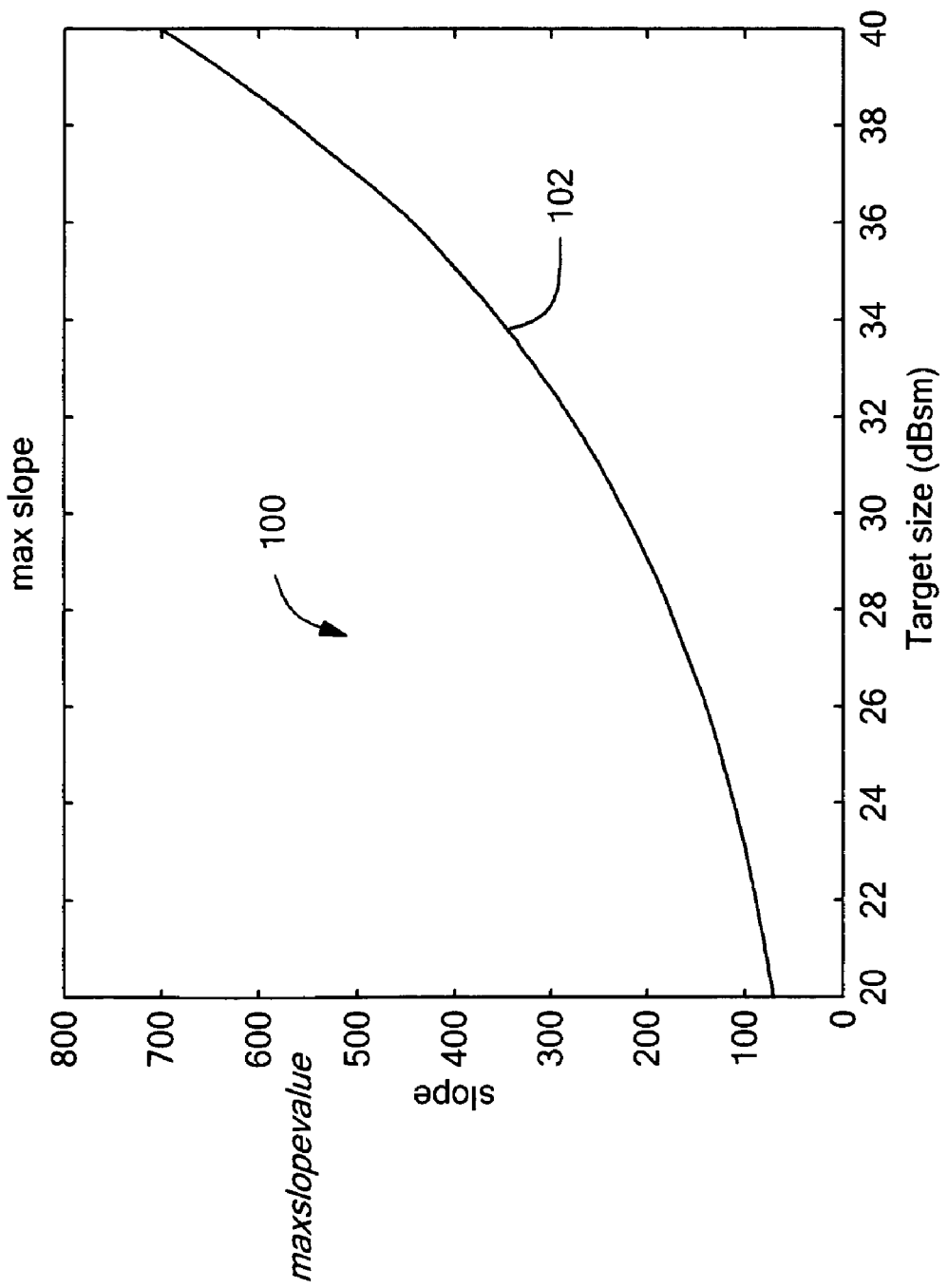
FIG. 3 is a graph showing maximum expected signal slope versus target size associated with time samples of a downconverted signal provided by the FMCW radar system of FIG. 2.

Referring now to FIG. 3, a graph 100 has a horizontal scale in units of dBsm (decibels re: 1 square meter), corresponding to a radar cross section of a variety of target sizes. A vertical scale corresponds to a maximum expected slope associated with time samples of a downconverted signal (e.g., time samples 76, FIG. 2). A curve 102 is indicative of the maximum expected slope for different targets having different radar cross sections at any range within predetermined range limits.

Slope absolute value associated with the time samples 76 (FIG. 2) can be provided for each time sample $j=1:N-1$ (N=number of time samples associated with a chirp) as:

$$\text{slope}(j) = |\text{time sample}(j+1) - \text{time sample}(j)|$$

It will be recognized that slope(j) is an array having array values, and more particularly, a slope array having slope values, each associated with the time samples 76. The number of slope values in slope(j) can be the same as or different from the number of time samples 76 (FIG. 2). In one particular embodiment, the number of slope values in slope(j) is less than the number of time samples 76.

The curve 102 can be generated in the following way. A maximum frequency associated with the time samples (corresponding to a maximum target range) can be computed as follows.

$$f_{\max} = \frac{2 \cdot R_{\max} \cdot B}{c \cdot \Delta t}$$

where:
R$_{max}$=maximum range;
c=speed of light;
Δt=frequency sweep time;
f$_{max}$=maximum received frequency; and
B=bandwidth of the frequency sweep.

Conversely, a range that corresponds to each of the frequencies less than f$_{max}$ can be calculated as follows.

$$R = \frac{c \cdot \Delta t \cdot f}{2 \cdot B}$$

A free space range loss at each of the ranges (i.e., frequencies) can be calculated as follows:

$$\text{rangeloss}(f) = \frac{1}{(4\pi)^2 \cdot R^4}$$

A frequency dependent gain of a receiving amplifier, ampgain(f), for example, a receiving amplifier associated with the down converter 68 of FIG. 2, is system dependent. In some embodiments, the gain of the receiving amplifier, ampgain(f), is selected to reverse compensate for the above free space range loss.

A maximum expected slope associated with the time samples can be computed over all possible frequencies (i.e., ranges) as follows:

maximum expected slope(j)=|RangeFreqSlope(j)
·rangeloss(j)·ampgain(j)·RCS| where j=1 to the highest frequency (FFT bin number). RangeFreqSlope(j) is a maximum slope of a received signal at a range corresponding to the jth range based on the system parameters of sample rate and sample time. The frequency used to find the jth element of RangeFreqSlope(j) is found by replacing R$_{max}$ in the above equation (for f$_{max}$) with the value of the jth range. RCS is a radar cross section of the target.

The above equation for maximum expected slope(j) provides a maximum expected slope array having maximum expected slope values. Any one of the maximum expected slope values, representative of slope at the variety of ranges, can be a maximum slope value, maxslopevalue, associated with a given radar cross section shown in the curve 102. It will be appreciated that the maxslopevalue can occur for the target at any range (i.e., for any frequency) due to dependence upon the amplifier gain, ampgain(f), and is not necessarily at the closest range.

It will become apparent below that the maxslopevalue selected from the array, maximum expected slope(j), can be used as a threshold against which slope array values can be compared.

Referring now to FIG. 4, a graph 120 includes a horizontal scale in units of slope sample number, wherein the slope sample number is associated with the time samples 76 (FIG. 2) according to the above equation for slope(j). In one particular embodiment, there are two hundred fifty five slope samples (and two hundred fifty six time samples). However, in other embodiments the number of slope samples can be less than or greater than two hundred fifty five and the number of time samples can be greater than or less than two hundred fifty six. The graph includes a vertical scale in units of slope absolute value in accordance with the equation for slope(j) given above.

A curve 126 is representative of slope absolute values associated with the time samples 76 (FIG. 2) according to the above equation for slope(j). The curve 126 connects slope samples, slope(j), which are not individually shown. The curve 126 includes curve portions 126a, 126b representative of the time samples 76 having relatively small slopes and a curve portion 126c representative of the time samples 76 having a relatively high slope. It will become apparent than the curve portion 126c is indicative of an interfering signal.

A first threshold 122, referred to herein as a maximum slope threshold, corresponds to the above-identified maxslopevalue. As described above, the maxslopevalue is the maximum expected slope for a target having a predetermined radar cross section, at whatever range yields the maximum slope. Therefore, it should be apparent that the curve 126 should rarely cross above the maximum slope threshold 122 except for the presence of an interfering signal.

A second threshold 124, referred to herein as a mean slope threshold, is representative of a mean slope along the entire curve 126, including the curve portion 126c, scaled by a constant factor, K. The mean slope threshold can be computed, for example as:

$$K * MeanValue = \frac{\sum_{j=1}^{255} \text{Slope}(j)}{255} * K$$

In one particular embodiment, the constant factor, K, has a value of three. The factor, K, is selected to provide a low false alarm rate, i.e., a low rate at which the curve 126 crosses the second threshold 124. The factor, K, is also selected to provide a good probability of detection, i.e., presence of an interfering signal is most often detected by techniques described below. It should be apparent that the curve 126 should rarely cross above the mean slope threshold 124 except for the presence of an interfering signal.

While the mean slope threshold 124 is shown to be lower than the maximum slope threshold 122, the opposite is also possible. In an alternate embodiment, computation of the mean slope threshold excludes the curve portion 126c, for example, to the extent that the samples have crossed the maximum slope threshold.

The interfering signal is identified, for example, by the interference detector 78 of FIG. 2, which can generate the curve 126 and the first and second thresholds 122, 124. To this end, in one particular embodiment, detection of an interfering signal is made in accordance with the curve 126 crossing (i.e., exceeding) both the maximum slope and mean slope thresholds 122, 124. In another embodiment, detection of an interfering signal is made in accordance with the curve 126 crossing (i.e., exceeding) only the maximum slope threshold 122. In yet another embodiment, detection of an interfering signal is made in accordance with the curve 126 crossing (i.e., exceeding) only the mean slope threshold 124.

In some arrangements, the detection can be made in accordance with a selected number of slope values exceeding the maximum slope threshold 122 and the mean slope threshold 124. The selected number can be any number greater than one. For example, in one particular embodiment, to detect an interfering signal, at least two slope values must exceed the two thresholds, a first and a last slope value. In some embodiments, the selected number of slope values exceeding the thresholds is dynamically determined.

Once the interfering signal is detected by way of a crossing of one or both of the maximum slope threshold 122 and the mean slope threshold 124, an extent of the interfering signal is determined, for example, by the interference extent processor 88 of FIG. 2. To this end, crossings can be identified, where the crossings correspond to the curve 126 (i.e., the slope) crossing the mean slope threshold 124.

The portion 126c of the curve 126, representative of a slope of an interfering signal, crosses the average threshold 124 at two points 130, 132 and also, in some instances, at intermediate points, of which a point 143 is but one example. The point 130 is associated with an earlier slope sample and is referred to herein as a lower slope sample limit. Similarly, the point 132 is associated with a later slope sample and is referred to herein as an upper slope sample limit.

A first guard band value having a selected number of slope sample points is subtracted from the lower slope sample limit 130 to achieve the point 136, referred to herein as a lower slope sample extent. A second guard band value is added to the upper slope sample limit 132 to achieve the point 138, referred to herein as an upper slope sample extent. In one particular embodiment, the first and second guard band values are the same, for example, five samples. However, in other embodiments, the first and second guard band values can be greater than or less than five samples, and they can be the same or different guard band values. In some embodiments, the first and second guard band values are dynamically determined, for example, in accordance with a shape of the curve portion 126c.

The first and second guard band values are selected in order to achieve subsequent removal of time samples associated with the slope samples between the points 136 and 138. The first and second guard band values are selected to avoid time samples associated with any residual part of the curve portion 126c (for example, leading and trailing edges of the curve portion 126c that are below the mean slope threshold 124) from remaining once eliminated from time samples as described below.

While the points 130, 132, 136, 138, 143 are described in conjunction with crossings of the mean slope threshold 124, in other embodiments, the crossings are determined in accordance with crossings of the maximum slope threshold 122.

While the curve 126 represents a slope array having slope values, in particular slope absolute values, other types of arrays having other array values can also be used. As described further below, the array and associated array values can include, but are not limited to, a slope (i.e., first derivative) array having slope values (slope absolute values as shown in FIG. 4), a higher order derivative array having higher order derivative values, a power array having power values, and a time sample absolute value array having time sample absolute values. For each array type, corresponding thresholds comparable to the maximum slope threshold 122 and the mean slope threshold 124 can be established and used in much the same way as described above. For example, in another embodiment using a higher order derivative array, a maximum higher order derivative threshold and a mean higher order derivative threshold could be used in place of the maximum slope threshold 122 and the mean slope threshold 124. In yet another embodiment using a power array, a maximum power threshold and a mean power threshold could be used in place of the maximum slope threshold 122 and the mean slope threshold 124. In yet another embodiment using a time sample absolute value array, a maximum time sample absolute value threshold and a mean time sample absolute value threshold could be used in place of the maximum slope threshold 122 and the mean slope threshold 124. Accordingly, for any array type, sample limits comparable to the upper and lower slope sample limits 132, 130, respectively, and sample extents comparable to the upper and lower slope sample extents 138, 136, respectively could be identified.

While the curve 126 corresponds to slope values described to be slope absolute values, it should be appreciated that, in other arrangements, the slope values can instead can be non-absolute slope values, which may have two polarities.

Referring now to FIG. 4A a graph 150 includes a horizontal scale in units of time sample number, wherein the time sample number is associated with the time samples 76 (FIG. 2). As shown, there are two hundred fifty six time samples. However, in other embodiments the number of time samples can be less than or greater than two hundred fifty six. The graph 150 also includes a vertical scale in units of time sample amplitude as represented by digital counts 76 (FIG. 2) provided, for example, by the analog-to-digital (A/D) converter 74 of FIG. 2.

A curve 152 is representative of the time samples 76 associated with the downconverted signal 73 (FIG. 2). The curve 152 connects the time samples, which are not individually shown. The curve 152 includes curve portions 152a, 152b representative of the time samples 76 having no interfering signal and a curve portion 152c representative of the time samples 76 having an interfering signal.

It will be apparent that the curve portion 152c generally aligns with the curve portion 126c of FIG. 4; i.e., the interfering signal represented in time by the curve portion 152c has a relatively high slope, represented by the curve portion 126c. Therefore, the interfering signal lower slope limit extent 136 and the interfering signal upper slope limit extent 138, which correspond to slope sample numbers, are associated with points 162, 164, respectively, corresponding to time sample numbers. The point 162 is referred to herein as an interfering signal lower time sample extent and the point 164 is referred to herein as an interfering signal upper time sample extent.

As described above, the points 136 and 138 have guard band values applied. Therefore, the points 162, 164 form a region 160 having boundaries 160a, 160b surrounding the interfering signal, without leaving a residual part of the interfering signal outside of the region 160.

It will become apparent from discussion below that time samples between the interfering signal lower time sample extent 162 and the interfering signal upper time sample extent 164 can be removed from the group of two hundred fifty six time samples before further processing.

Figure 5:
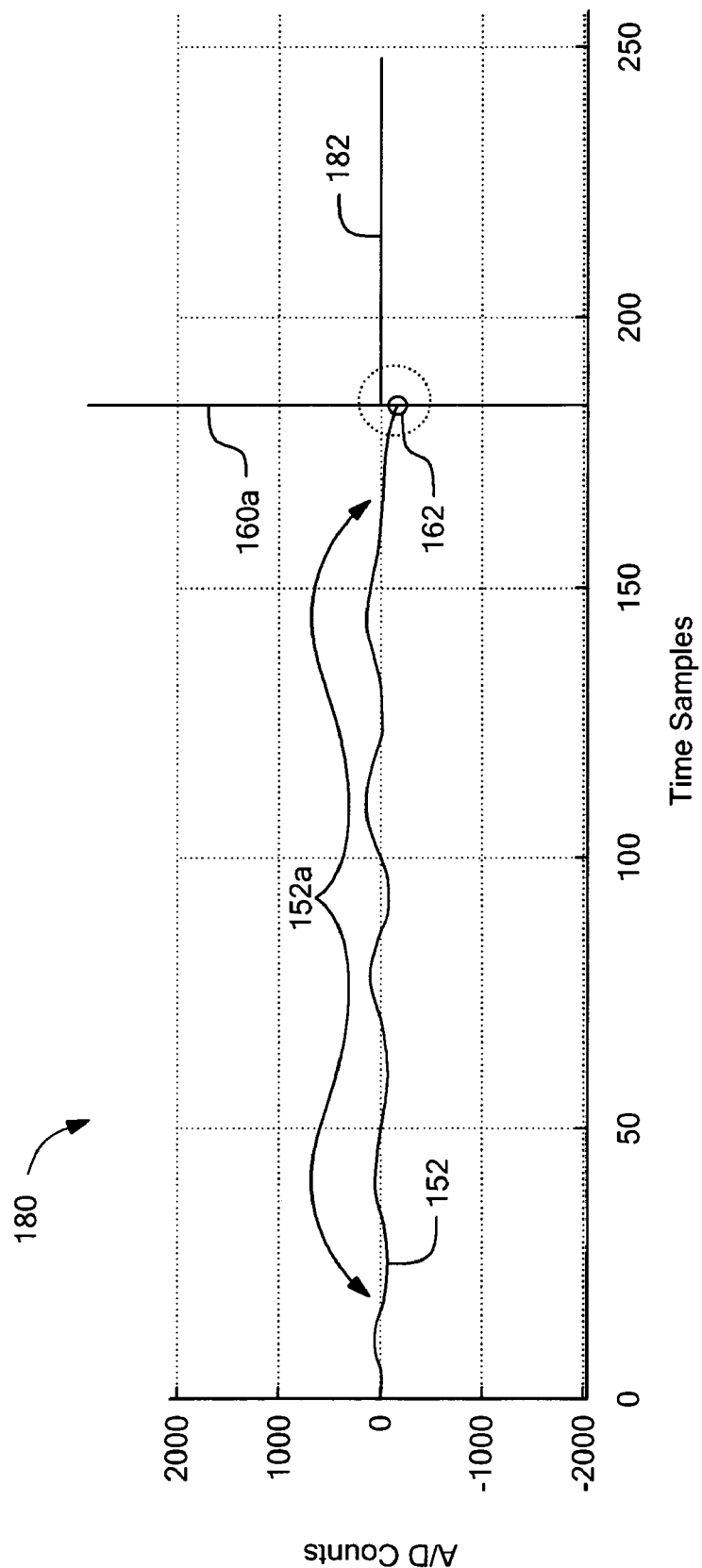
FIG. 5 is a graph showing time samples of a downconverted signal provided by the FMCW radar system of FIG. 2 in which the interfering signal is removed.

Referring now to FIG. 5, in which like elements of FIG. 4A are shown having like reference designations, a graph 180 includes a horizontal scale in units of time sample number, wherein the time sample number is associated with the time samples 76 (FIG. 2). As shown, there are two hundred fifty six time samples. However, in other embodiments the number of time samples can be less than or greater than two hundred fifty six. The graph includes a vertical scale in units of time sample amplitude as represented by digital counts 76 (FIG. 2) provided, for example, by the analog-to-digital (A/D) converter 74 of FIG. 2.

The curve 152 is shown having only the curve portion 152a. The lower time sample extent represented by the point 162 terminates the curve 152 at the boundary 160a, effectively eliminating the curve portions 152c and 152b of FIG. 4A. From the lower time sample extent 162 to at least time sample number two hundred fifty five, the curve 152 is extended with zero values 182. In some embodiments, the curve 152 is further extended with zero values to provide more data points for a FFT processing. The zero values added to the curve 152 are referred to herein as "zero padding." In other embodiments, the curve 152 can be extended with other values, more generally referred to herein as "padding."

Figure 1:
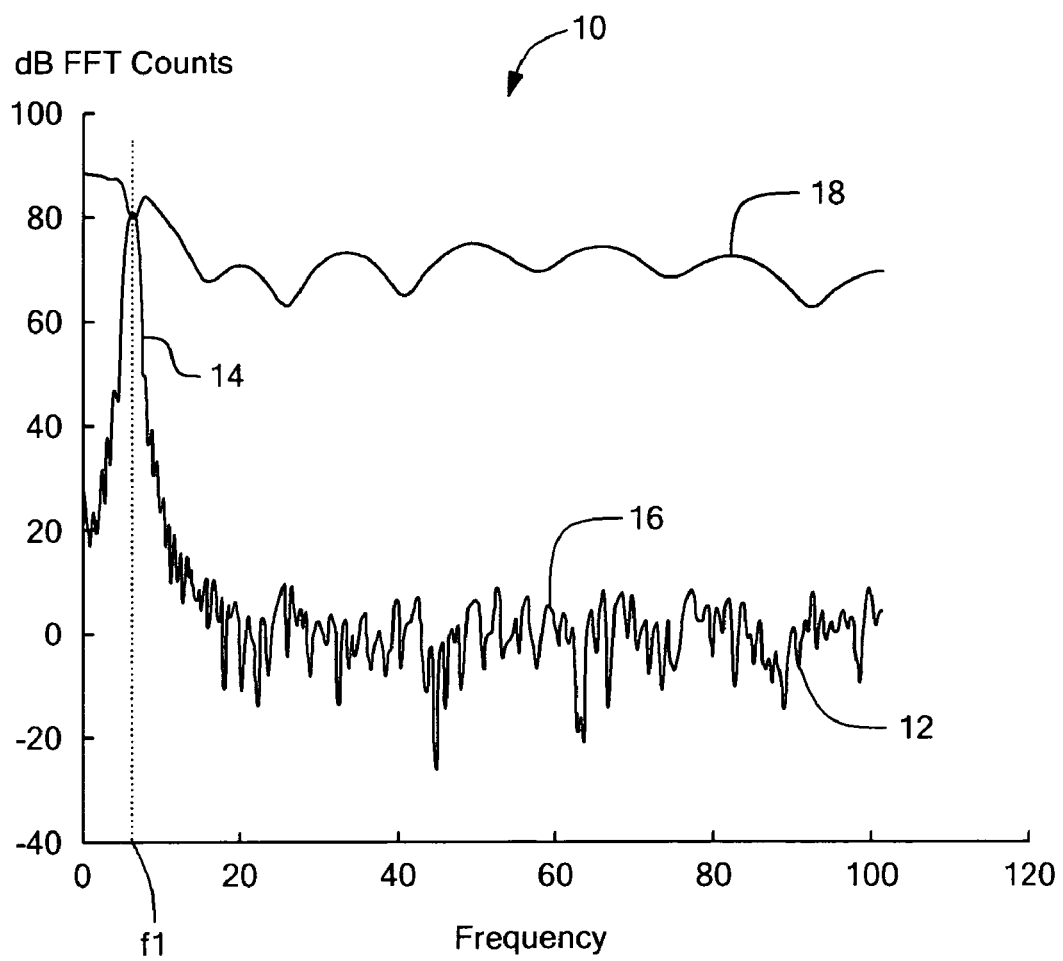
FIG. 1 is a graph of an FMCW radar downconverted signal in the frequency domain, shown both without the presence of an interfering signal and with the presence of an interfering signal.
Figure 6:
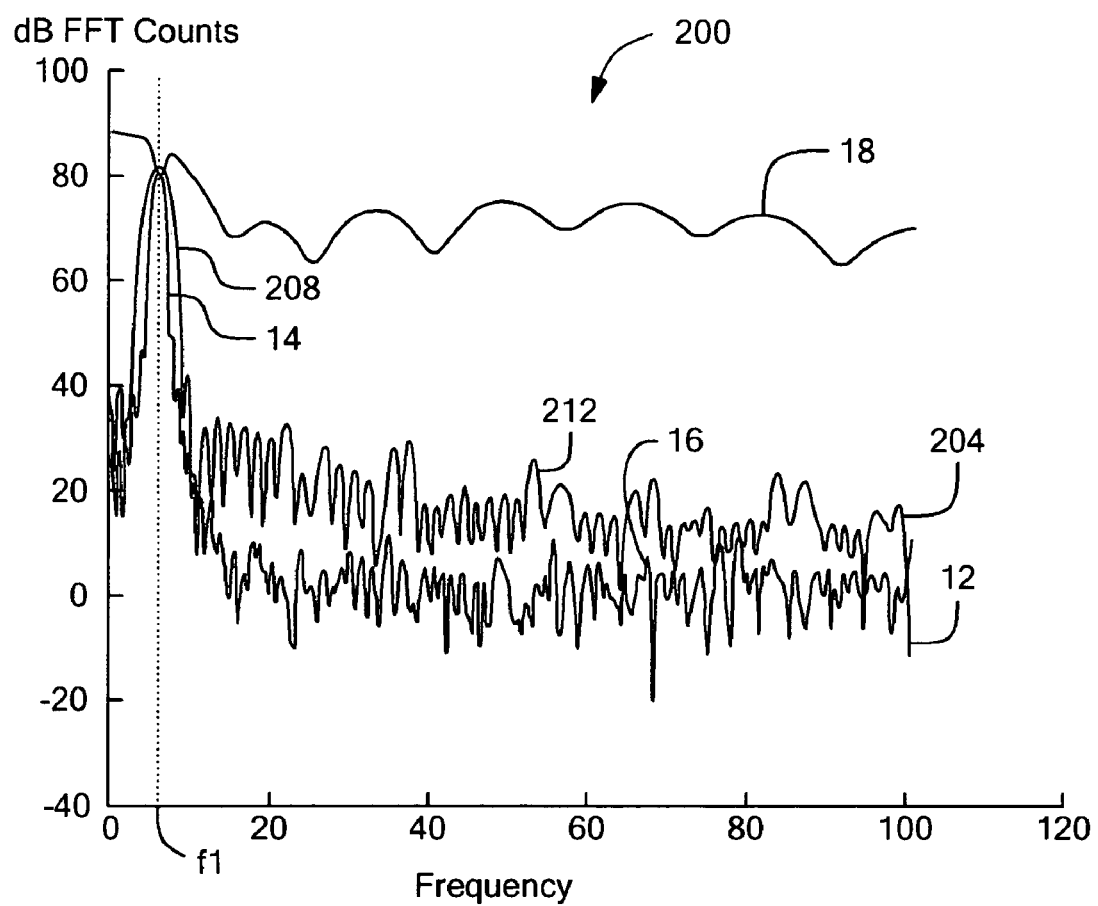
FIG. 6 is another graph of an FMCW radar system downconverted signal in the frequency domain, shown both without the presence of an interfering signal and with the presence of an interfering signal, shown both with and without the system and methods of the present invention.

Referring now to FIG. 6, in which like elements of FIG. 1 are shown having like reference designations, a graph 200 has a horizontal axis in units of frequency provided as FFT frequency bins and a vertical axis in units of dB in FFT counts (provided by FFT processing of time samples 76 (FIG. 2) of the downconverted signal 73 (FIG. 2)). As described above, the curve 12 is representative of a frequency domain signal having a peak 14 indicative of a beat frequency, f1, and a corresponding range to a target. The curve 12 also has a noise background 16. The curve 18 has no distinct peak. The curve 18 is representative of a frequency domain signal indicative of the output of the FFT frequency domain processing when a received signal represented by the curve 12 also includes an interfering signal. In the curve 18, either the peak 14 cannot be found, or the peak 14 cannot be accurately found.

A curve 204 is representative of a resulting frequency domain signal provided by the above-described techniques shown in FIGS. 4-6. Some time samples used to generate the curve 204 are the same as the time samples used to compute the curve 18, however, for the curve 204, time samples associated with the interfering signal have been removed by the above-described techniques.

The curve 204 has a peak 208. The curve 204 also has a noise region 212. Comparing the curve 12 achieved in the presence of a target and no interfering signal with the curve 204 achieved in the presence of the target and the interfering signal, which is removed by the above-described technique, it can be seen that that the peak 204 substantially aligns with the peak 14, but is wider. It can also be seen that the noise background 212 is higher than the noise background 16. It will be understood that both the wider peak 208 and the higher noise background 212 achieved in the presence of the target and the interfering signal, which is removed, tend to reduce an accuracy of the FMCW radar system compared to that of curve 12 achieved by the FMCW radar system in the presence of the target and no interfering signal. However, it can also bee seen that the peak 208, indicative of a range to the target, can be identified, while a corresponding peak cannot be identified in the curve 18 achieved in the presence of the target and an interfering signal, which is not removed by the above-described technique. Therefore, the above-described technique is able to greatly improve the accuracy of the radar system in the presence of both a target and an interfering signal.

Figure 7:
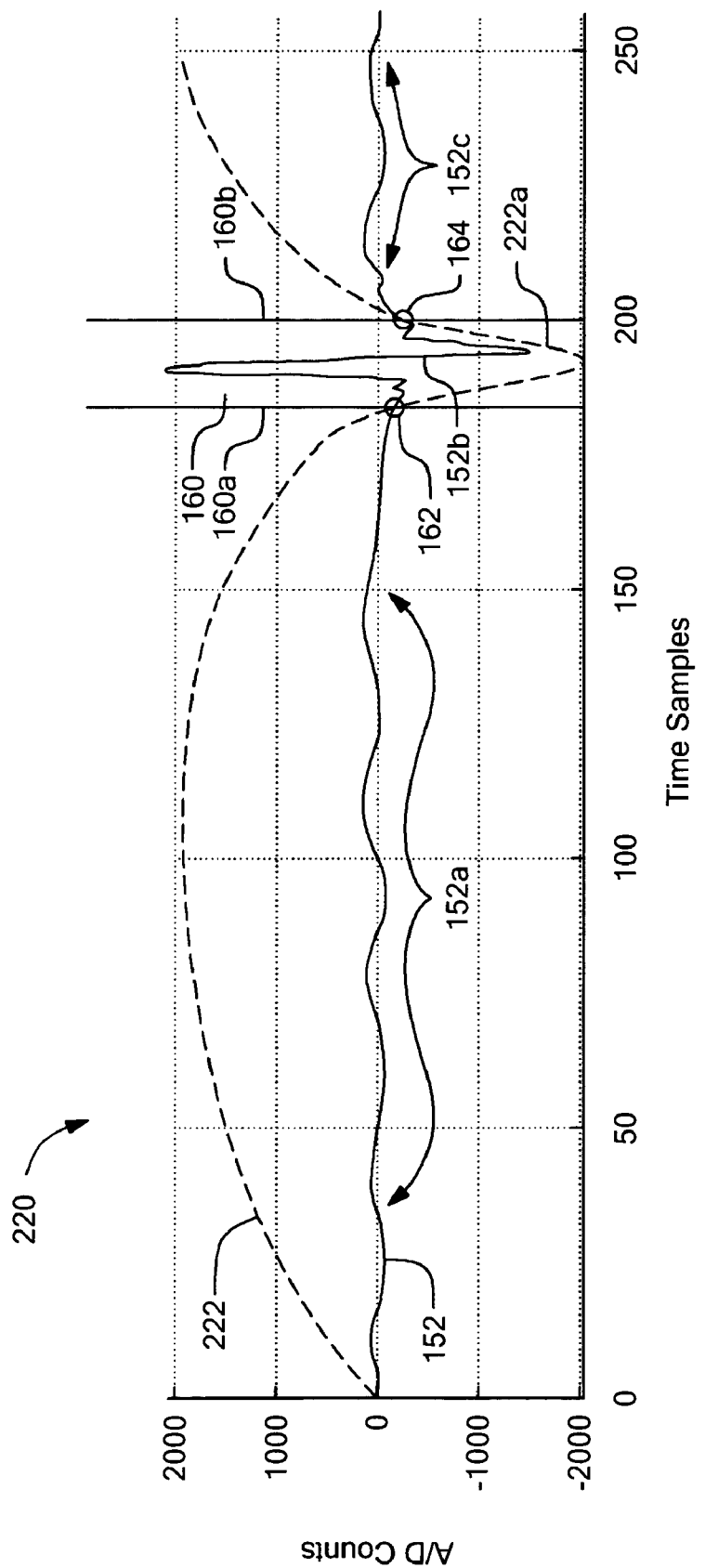
FIG. 7 is a graph showing time samples of a downconverted signal in the presence of an interfering signal and an associated weighting function provided by an alternate FMCW radar system according to FIG. 2.

Referring now to FIG. 7, in which like elements of FIG. 4A are shown having like reference designations, a graph 220 includes a horizontal scale in units of time sample number, wherein the time sample number is associated with the time samples 76 (FIG. 2). The graph 220 also includes a vertical scale in units of time sample amplitude as represented by digital counts 76 (FIG. 2) provided, for example, by the analog-to-digital (A/D) converter 74 of FIG. 2.

As described above, the curve 152 is representative of the time samples 76 associated with the downconverted signal 73 (FIG. 2). The curve 152 includes the curve portions 152a, 152b representative of the time samples 76 having no interfering signal and the curve portion 152c representative of the time samples 76 having an interfering signal.

The interfering signal lower time sample extent 162 and the interfering signal upper time sample extent 164 define the region 160.

A curve 222 having a notch 222a is representative of a mathematical weighting function that can be applied to the time samples. It will be recognized that, when applied to the time samples represented by the curve 152, time samples in the region 160 would tend to be reduced, i.e., the interfering signal 152b would tend to be reduced, and two hundred fifty six windowed samples would still remain. In some embodiments, the two hundred fifty six windowed samples could be padded, for example, with another two hundred fifty six values, to provide additional samples to be used in subsequent FFT processing.

The curve 222 represents but one example of a weighting function that could be used. Other weighting functions can also be used. For example, in some embodiments, a weighting function can be generated based on a combination of windowing functions. For example, in one particular embodiment, in which a group of two hundred fifty six time samples (e.g., 76, FIG. 2) have fifty samples corrupted by an interfering signal, a weighting function can be constructed by multiplying a two hundred fifty six sample Hamming windowing function with a (1-Cosine) weighting function in the region of the fifty corrupted samples. In another embodiment, the weighting function can be the (1-Cosine) weighting function in the region of interference of the fifty samples without combination with another windowing function.

It should be appreciated that FIGS. 8-10B show flowcharts corresponding to the below contemplated technique which would be implemented in the FMCW radar system 50 (FIG. 2). The rectangular elements (typified by element 252 in FIG. 8), herein denoted "processing blocks," represent computer software instructions or groups of instructions. The diamond shaped elements (typified by element 258 in FIG. 8), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 8, a process 250 begins at block 252, where a radar signal is received, for example, with the FMCW receiving system 66 of FIG. 2.

At block 253, the received radar signal is received, providing a downconverted radar signal, e.g., the downconverted radar signal 73 of FIG. 2.

At block 254, the downconverted radar signal 73 is time sampled, for example by the A/D converter 74 of FIG. 2 to provide time samples 76 (FIG. 2).

As described above, an interfering signal can be present within the time samples. At block 256 the time samples are processed to detect an interfering signal, for example, with the interference detector 78 of FIG. 2. The time samples can be processed, for example, in accordance with techniques described in conjunction with FIGS. 4 and 4A. The processing of the time samples is also further described in conjunction with FIG. 9.

A decision is made at decision block 258 as to whether an interfering signal has been detected. If an interfering signal is detected at block 258, the process continues to block 260, where an extent of the interfering signal is determined, for example, with the interference extent processor 88 of FIG. 2. The determination can be made, for example, in accordance with techniques described in conjunction with FIGS. 4 and 4A. The determination is also further described in conjunction with FIG. 10.

At block 262, the identified interfering signal is removed from the time samples generated at block 254, for example, by the interference removal processor 92 of FIG. 2. The removal can be made, for example, in accordance with techniques described in conjunction with FIGS. 5 and/or 7. The removal is also further described in conjunction with FIGS. 10A and 10B.

At block 264, a signal 94 (FIG. 2) from which the interfering signal is removed, is processed, for example, with the radar return signal processor 82 of FIG. 2 to generate a radar system detection and/or classification of a target, represented by signal 84 of FIG. 2. The processing at block 264 can include, for example, a frequency domain conversion, e.g., an FFT.

In one particular embodiment, the radar system detection and/or classification of a target can be associated with a vehicle side object detection system, for example, as described in U.S. Pat. No. 6,577,269, issued Jun. 10, 2003. However, the above described system and techniques are not limited to a vehicle application.

Referring now to FIG. 9, a process 300, which can be performed, for example by the interference detector 78 of FIG. 2, begins at block 302 where a slope array having slope array values is generated in accordance with time samples generated at block 254 of FIG. 8. The slope array is represented, for example, by the curve 126 in FIG. 4.

At block 304, a first threshold is generated. In one particular embodiment, the first threshold corresponds to the maximum slope threshold 122 of FIG. 4. At block 306, a second threshold is generated. In one particular embodiment, the second threshold corresponds to the mean slope threshold 124 of FIG. 4.

At block 308, the slope array values generated at block 302 are compared against the first and/or second thresholds generated in blocks 304, 306.

At decision block 310, if at least a selected number of slope array values generated at block 302 cross (i.e., exceed) both the first and second thresholds, then existence of an interfering signal is identified at block 312, i.e., the interfering signal is detected. The selected number can be any number greater than one. In one particular embodiment, the selected number is two. In some embodiments, the selected number is dynamically determined.

As described in conjunction with FIG. 4, in the particular embodiment shown, detection of an interfering signal is made in accordance with the slope array values (curve 126 of FIG. 4) crossing both the first and second thresholds (maximum slope and mean slope thresholds 122, 124) generated in blocks 304 and 306. In another embodiment, detection of an interfering signal is made in accordance with the slope array values crossing only the first threshold (maximum slope threshold 122). In yet another embodiment, detection of an interfering signal is made in accordance with the slope array values crossing only the second threshold (mean slope threshold 124).

If, at decision block 310, none of the slope array values cross the first and second threshold, then at block 314, no interfering signal is detected.

It will be understood that the process 300 can be performed on data corresponding, for example, to one radar chirp, and the process 300 can be repeated for each subsequent radar chirp, or for selected ones of successive radar chirps.

The process 300 is described in conjunction with a slope array having slope values, a corresponding maximum slope threshold, and a corresponding mean slope threshold. However, as described, for example, in conjunction with FIG. 4, in other embodiments, other array types having other array value types can be used along with corresponding maximum and mean thresholds associated with the other array value types.

Referring now to FIG. 10, a process 350, which can be performed, for example by the interference extent processor 88 of FIG. 2, begins at block 352 where a lower slope sample limit is identified in accordance with an interfering signal. At block 354 an upper slope sample limit is identified. The upper and lower slope sample limits are represented, for example, by the points 130, 132 of FIG. 4.

At block 356 a first sample guard band value is selected and at block 358, a second guard band value is selected. The sample guard band value selection is described above in conjunction with FIGS. 4 and 4A. The guard band value selection can be static or dynamic.

At block 360, the first sample guard band value is subtracted from the lower slope sample limit to provide an interfering signal lower slope sample extent. Similarly, at block 362, the second sample guard band value is added to the upper slope sample limit to provide an interfering signal upper slope sample extent. The interfering signal upper and lower slope sample extents are represented, for example, by the points 138, 136, respectively, of FIG. 4.

At block 364, an interfering signal lower time sample extent is identified in accordance with the interfering signal lower slope sample extent. Similarly, at block 366, an interfering signal upper time sample extent is identified in accordance with the interfering signal upper slope sample extent. The upper and lower time sample extents are represented, for example, by the points 164, 162, respectively, of FIG. 4A, which are seen to coincide with the upper and lower slope sample extents 138, 136, respectively, of FIG. 4.

It will be understood that the process 350 can be performed on data corresponding, for example, to one radar chirp, and the process 350 can be repeated for each subsequent radar chirp, or for selected ones of successive radar chirps.

The process 350 is described in conjunction with slope sample limits and extents. However, as described, for example, in conjunction with FIG. 4, in other embodiments, other array sample limits and extents associated with other types of array values can be used.

Figure 10B:
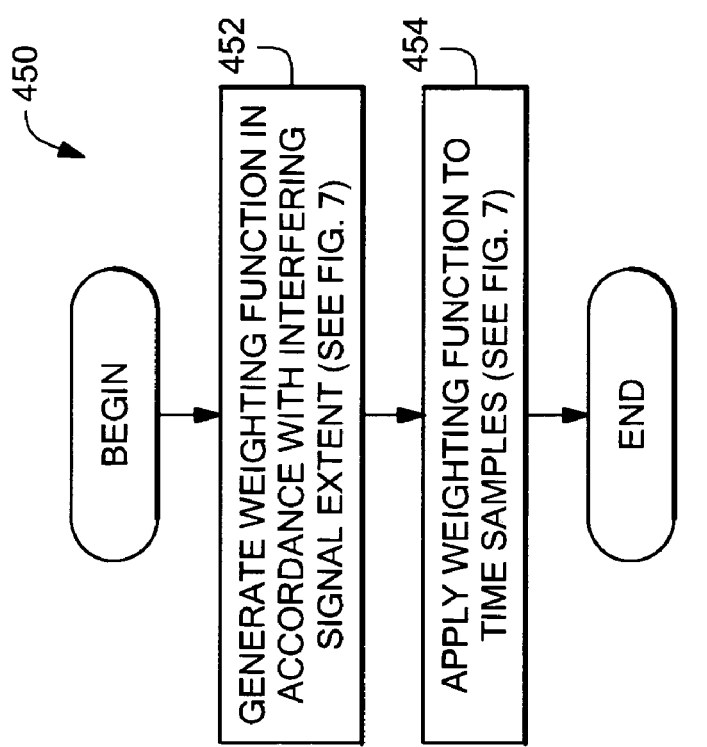
FIG. 10B is a flow chart showing alternate details of the process of FIG. 8.
Figure 10A:
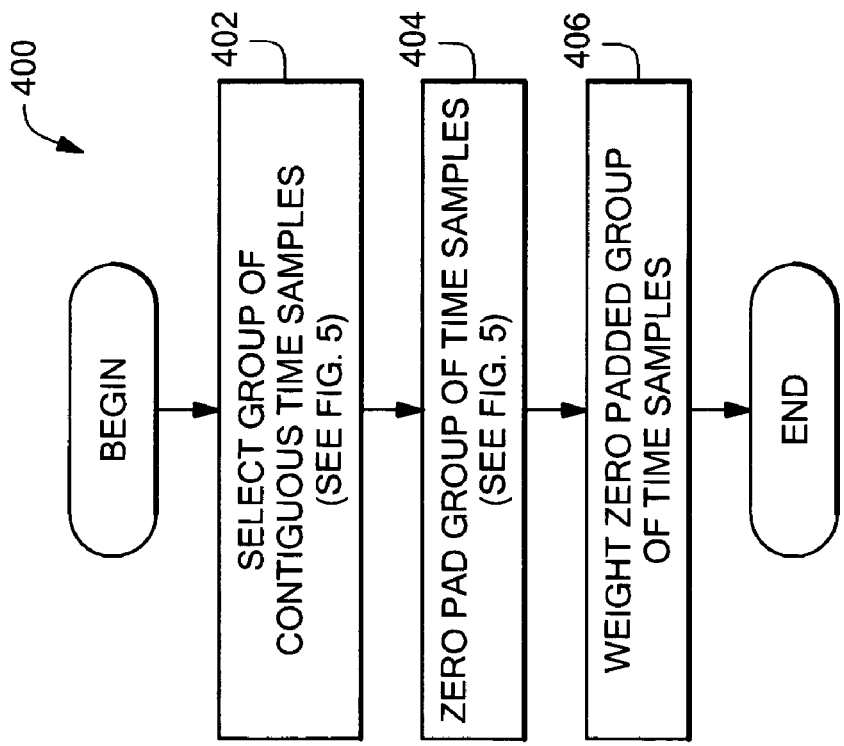
FIG. 10A is a flow chart showing further details of the process of FIG. 8.

Referring now to FIG. 10A, a process 400, which can be performed, for example, by the interference removal processor 92 of FIG. 2, begins at block 402, where a contiguous group of time samples are selected from within time samples (76, FIG. 2), excluding time samples between the interfering signal lower time sample extent and the interfering signal upper time sample extent identified at blocks 362 and 364 of FIG. 10. The selected time samples can correspond, for example, to the curve portion 152*a* of FIGS. 4A and 5. The selected time samples can correspond instead, for example, to the curve portion 152*b* of FIGS. 4A and 5. In some embodiments, the selected time samples are selected to be a largest group of contiguous time samples excluding time samples between the interfering signal lower time sample extent (e.g., 152*a*).

At block 404, the selected group of time samples are padded, for example, with the zero padding 182 shown in FIG. 5. However, in other embodiments, the selected group of time samples are padded with a value other than zero. In still other embodiments, the selected group of time samples are not zero-padded.

The zero padded time samples can then be further processed, for example by the radar return signal processor 82 of FIG. 2. The radar return signal processor 82 can, for example, perform an FFT on the zero padded time samples. However, in one particular embodiment, the zero padded time samples can be weighted at block 406 prior to FFT processing, for example with a conventional windowing function such as a Hanning or Hamming windowing function.

It will be understood that the process 400 can be performed on data corresponding, for example, to one radar chirp, and the process 400 can be repeated for each subsequent radar chirp, or for selected ones of successive radar chirps.

The process 400 is described in conjunction with a slope array. However, as described, for example, in conjunction with FIG. 4, in other embodiments, other types of arrays can be used.

Referring now to FIG. 10B, a process 450, which can be performed, for example, by the interference removal processor 92 of FIG. 2, represents an alternate method to that of FIG. 10A. The method 450 begins at block 452, where a conventional or a non-conventional weighting function is generated in accordance with the interfering signal lower time sample extent and the inferring signal upper time sample extent identified at blocks 362 and 364 of FIG. 10. The weighting function can correspond, for example to the weighting function 222 of FIG. 7. The weighting function is selected to provide a reduced interfering signal once the weighting function is applied to the time samples (76, FIG. 2).

At block 454, the weighting function is applied to the time samples (i.e., the time samples are multiplied by the weighting function), including the time samples between the interfering signal lower time sample extent and the interfering signal upper time sample extent.

The weighted time samples can then be further processed, for example by the radar return signal processor 82 of FIG. 2. The radar return signal processor 82 can, for example, perform an FFT on the weighted time samples generated at block 454.

It will be understood that the process 450 can be performed on data corresponding, for example, to one radar chirp, and the process 450 can be repeated for each subsequent radar chirp, or for selected ones of successive radar chirps.

The process 450 is described in conjunction with a slope array. However, as described, for example, in conjunction with FIG. 4, in other embodiments, other types of arrays can be used.

The method of interference rejection described above is not only applicable to a radar return signal having a continuous wave (CW) interfering signal but is also applicable to a radar return signal having any in-band interfering signal. The system and method described above encompass removal of corrupted data samples from a time sampled radar return signal in any FMCW radar operating at any frequency and having any bandwidth, with any type of interfering signal. It should be apparent that, because the interfering signal can be identified and removed in each chirp return signal, the interfering signal need not be at the same frequency in each chirp return signal, nor must it have the same characteristics. There can also be more than one interfering signal within the chirp return signal.

While a slope array having slope array values is described in embodiments herein, as described above, the array and associated array values can include, but are not limited to, the slope (i.e., first derivative) array having the slope values (slope absolute values as shown in FIG. 4) described, for example, by slope(j)=|time sample(j+1)−time sample(j)|, a higher order derivative array having higher order derivative values, a power array having power values described, for example, by power(j)=[time sample(j)]$^2$, and a time sample absolute value array having time sample absolute values described, for example, by absolute value(j)=|time sample(j)|.

It will be apparent than when using a different type of array than the slope array (e.g., curve 126, FIG. 4), the above described first and second thresholds (e.g., 122, 124, FIG. 4) are no longer associated with slope values and the slope sample limits and interfering signal slope sample extents (e.g., points 136, 130, 132, 138, FIG. 4) are no longer associated with slope sample numbers. Instead the first and second thresholds are associated with a maximum array value and a mean array value, respectively, according to the type of array used. Similarly, the array sample limits and interfering signal array sample extents are associated with array sample numbers, according to the type of array used.

All references cited herein are hereby incorporated herein by reference in their entirety. Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of processing a radar return signal, comprising:

generating a first array having time sample elements with respective time sample values associated with the radar return signal;

processing the first array to detect an interfering signal in the time sample elements, wherein the processing comprises:

generating a second array having second array elements with respective second array values associated with the time sample values, wherein the second array values comprise at least one of slope values generated from differences of the time sample values, higher order derivative values generated from differences of differences of the time sample values, or power values, each power value generated by squaring a respective out of the time sample values;

determining, from among the second array elements, second array elements indicative of the interfering signal, wherein the determining comprises: generating at least one threshold associated with the second array values; comparing the second array values with the at least one threshold; and detecting that the interfering signal exists if at least a selected number of the second array values exceed the at least one threshold; and identifying time sample elements in the first array indicative of the interfering signal by one-to-one mapping at least one of the second array elements indicative of the interfering signal to a corresponding at least one of the time sample elements, wherein the mapping does not alter the time sample values of the first array; and removing, from the same first array having the same time sample elements and the same time sample values, the identified time sample elements indicative of the interfering signal.

2. The method of claim 1, wherein the generating at least one threshold comprises generating at least one of a first threshold related to a maximum expected second array value or a second threshold related to a mean value of the second array values.

3. The method of claim 2, wherein the comparing the second array values with the at least one threshold comprises comparing the second array values with at least one of the first threshold or the second threshold.

4. The method of claim 2, wherein the detecting that the interfering signal exists comprises identifying if at least the selected number of second array values exceed at least one of the first threshold or the second threshold.

5. The method of claim 1, wherein the associating the second array values indicative of the interfering signal with the time samples comprises:
    identifying a lower second array sample limit associated with a selected one of the selected number of second array values exceeding the at least one threshold;
    identifying an upper second array sample limit associated with another selected one of the selected number of second array values exceeding the at least one threshold;
    selecting a first sample guard band value;
    selecting a second sample guard band value;
    subtracting the first sample guard band value from the lower second array sample limit to provide an interfering signal lower second array sample extent;
    adding the second sample guard band value to the upper second array sample limit to provide an interfering signal upper second array sample extent; and
    identifying at least one of an interfering signal lower time sample extent or an interfering signal upper time sample extent in accordance with the interfering signal lower second array sample extent or the interfering signal upper second array sample extent, respectively.

6. The method of claim 5, wherein the removing, from the time samples, the time samples indicative of the interfering signal comprises selecting a group of contiguous time samples excluding time samples between the interfering signal lower time sample extent and the interfering signal upper time sample extent.

7. The method of claim 6, wherein the removing, from the time samples, the time samples indicative of the interfering signal further includes padding the group of contiguous time samples.

8. The method of claim 5, wherein the removing, from the time samples, the time samples indicative of the interfering signal comprises:
    generating a weighting function in accordance with the interfering signal lower time sample extent and the interfering signal upper time sample extent; and
    applying the weighting function to the time samples.

9. The method of claim 1, wherein the second array values comprise at least one of slope values generated from differences of the time sample values or higher order derivative values generated from differences of differences of the time sample values.

10. The method of claim 1, wherein the generating at least one threshold comprises generating a first threshold related to a maximum expected second array value and a second threshold related to a mean value of the second array values, and wherein the detecting that the interfering signal exists comprises identifying if at least the selected number of second array values exceed both the first threshold and the second threshold.

11. The method of claim 1, further comprising,
    transmitting a chirp transmit signal;
    receiving the radar return signal as a chirp return signal in response to the transmitting;
    converting the radar return signal to an electronic return signal;
    mixing the electronic return signal with a signal generated by a chirp oscillator to provide a downconverted signal; and
    sampling the downconverted signal to provide the first array.

12. The method of claim 1, wherein the removing comprises altering values of the identified time sample elements so as to be equal to predetermined values.

13. A method of detecting an interfering signal in a radar return signal, the method comprising:
    generating a first array having time sample elements with respective time sample values associated with the radar return signal;
    generating a second array having second array having second array elements with respective second array values associated with the time sample values, wherein the second array values comprise at least one of slope values generated from differences of the time sample values or higher order derivative values generated from differences of differences of the time sample values;
    generating at least one threshold associated with the second array values;
    comparing the second array values with the at least one threshold; and
    detecting that the interfering signal exists if at least a selected number of the second array values exceed the at least one threshold identifying time sample elements in the first array indicative of the interfering signal by one-to-one mapping at least one of the second array elements indicative of the interfering signal to a corresponding at least one of the time sample elements, wherein the mapping does not alter the time sample values of the first array.

14. The method of claim 13, wherein the generating at least one threshold comprises generating at least one of a first threshold related to a maximum expected second array value or a second threshold related to a mean value of the second array values.

15. The method of claim 13, wherein the generating the at least one threshold comprises generating both a first threshold related to a maximum expected second array value and a second threshold related to a mean value of the second array values, wherein the comparing comprises comparing the second array value to both the first and second thresholds, and wherein the detecting comprises detecting that the interference signal exists if at least the selected number of the second array values exceed both the first and second thresholds.

16. The method of claim 13, further comprising:
    transmitting a chirp transmit signal;
    receiving the radar return signal as a chirp return signal in response to the transmitting;
    converting the radar return signal to an electronic return signal;
    mixing the electronic return signal with a signal generated by a chirp oscillator to provide a downconverted signal; and sampling the downconverted signal to provide the first array.

17. System to process a radar return signal, comprising:
a radar receiving module adapted to provide a downconverted signal;
a radar signal sampling module coupled to the radar receiving module and adapted to provide a first array having time sample elements with respective time sample values associated with the downconverted signal;
an interference detector coupled to receive the first array and adapted to detect an interfering signal in the time sample elements, wherein the interference detector includes an array processor adapted to generate a second array having second array elements with respective second array values associated with the time sample values, wherein the second array values comprise at least one of slope values generated from differences of the time sample values, higher order derivative values generated from differences of differences of the time sample values, or power values, each power value generated by squaring a respective one of the time sample values wherein the array processor is further adapted to generate at least one threshold associated with the second array values, to compare the second array values with the at least one threshold, and to determine that the interfering signal exists in response to at least a selected number of the second array values exceeding the at least one threshold;
an interference extent processor coupled to the interference detector and adapted to identify time sample elements in the first array indicative of the interfering signal by determining, from among the second array elements, second array elements indicative of the interfering signal, and adapted to one to one map at least one of the second array elements indicative of the interfering signal to a corresponding at least one of the time sample elements, wherein the mapping does not alter the time sample values of the first array; and
an interference removal processor coupled to the interference extent processor and adapted to remove, from the same first array having the same time sample elements and the same time sample values, the identified time sample elements associated with the interfering signal.

18. The system of claim 17, wherein the array processor is further adapted to generate at least one threshold associated with the second array values, including at least one of a first threshold related to a maximum expected second array value, or a second threshold related to a mean of the second array values, wherein the interference detector is adapted to compare the second array values with at least one of the first threshold or the second threshold.

19. The system of claim 18, wherein the interference detector further includes a threshold processor adapted to detect that the interfering signal exists if at least a selected number of second array values exceed at least one of the first threshold or the second threshold.

20. The system of claim 17, wherein the interference extent processor includes a limit processor adapted to identify a lower second array sample limit associated with a selected one of the selected number of second array values exceeding the at least one threshold, to identify an upper second array sample limit associated with another selected one of the selected number of second array values exceeding the at least one threshold, to select a first sample guard band value, to select a second sample guard band value, to subtract the first sample guard band value from the lower second array sample limit to provide an interfering signal lower second array sample extent, to add the second sample guard band value to the upper second array sample limit to provide an interfering signal upper second array sample extent, and to identify at least one of an interfering signal lower time sample extent or an interfering signal upper time sample extent in accordance with the interfering signal lower second array sample extent or the interfering signal upper second array sample extent, respectively.

21. The system of claim 20, wherein the interference removal processor includes a selection processor adapted to select a group of contiguous time sample elements excluding time sample elements between the interfering signal lower time sample extent and the interfering signal upper time sample extent.

22. The system of claim 20, wherein the interference removal processor includes a weighting processor adapted to generate a weighting function in accordance with the interfering signal lower time sample extent and the interfering signal upper time sample extent and to apply the weighting function to the time sample values.

23. The system of claim 17, wherein the second array values comprise at least one of slope values generated from differences of the time sample values or higher order derivative values generated from differences of differences of the time sample values.

24. The system of claim 17, wherein the at least one threshold includes, including:
a first threshold related to a maximum expected second array value; and
a second threshold related to a mean of the second array values, and wherein the interference detector is adapted to compare the second array values with both the first threshold and the second threshold, and wherein the interference detector includes a threshold processor adapted to detect that the interfering signal exists if at least a selected number of second array values exceed both the first threshold and the second threshold.

25. The system of claim 17, wherein radar the receiving module is further adapted to receive a chirp signal and to mix the chirp signal with a signal generated by a chirp oscillator to provide the downconverted signal.

26. The system of claim 17, wherein the interference removal processor is adapted to remove, from the same first array having the same time sample elements and the same time sample values, the identified time sample elements associated with the interfering signal by altering the values of the identified time sample elements so as to be equal to predetermined values.

* * * * *

UNITED STATES PATENT AND TRADEMARK OFFICE
CERTIFICATE OF CORRECTION

PATENT NO.        : 7,403,153 B2
APPLICATION NO.   : 11/012679
DATED             : July 22, 2008
INVENTOR(S)       : Kelly, Jr. et al.

It is certified that error appears in the above-identified patent and that said Letters Patent is hereby corrected as shown below:

Column 5, Line 35, delete "embodiment," and replace with --embodiments,--.

Column 5, Line 37, delete "intead" and replace with --instead--.

Column 6, Line 19, delete "idenifies" and replace with --identifies--.

Column 6, Line 40, delete "times" and replace with --time--.

Column 8, Line 13, delete "than" and replace with --that--.

Column 10, Line 10, delete "can be" and replace with --be--.

Column 10, Line 12, delete "FIG. 4A a" and replace with --FIG. 4A, a--.

Column 11, Line 34, delete "that that" and replace with --that--.

Column 11, Line 43, delete "bee" and replace with --be--.

Column 13, Line 33, delete "above described" and replace with --above-described--.

Column 15, Line 33, delete "inferring" and replace with --interfering--.

Column 16, Line 16, delete "than" and replace with --that--.

Column 16, Line 17-18, delete "above described" and replace with --above-described--.

Column 16, Line 54, delete "out" and replace with --one--.

Column 18, Line 25-26, delete "having second array having second array" and replace with --having second array--.

UNITED STATES PATENT AND TRADEMARK OFFICE
CERTIFICATE OF CORRECTION

PATENT NO. : 7,403,153 B2
APPLICATION NO. : 11/012679
DATED : July 22, 2008
INVENTOR(S) : Kelly, Jr. et al.

It is certified that error appears in the above-identified patent and that said Letters Patent is hereby corrected as shown below:

Column 19, Line 21, delete "values" and replace with --values,--.

Column 20, Line 36, delete "includes, including:" and replace with --includes:"--.

Column 20, Line 47, delete "radar the receiving" and replace with --the radar receiving--.

Signed and Sealed this

Eleventh Day of August, 2009

David J. Kappos
*Director of the United States Patent and Trademark Office*